(12) United States Patent
Bacareza et al.

(10) Patent No.: US 8,874,074 B2
(45) Date of Patent: Oct. 28, 2014

(54) SYSTEM AND METHOD FOR PROVISIONING INTERNET ACCESS TO A COMPUTING DEVICE

(75) Inventors: Gio Bacareza, Makati (PH); Eduardo Ramon G. Joson, Quezon (PH); Rodolfo Albert A. Villarica, Quezon (PH); Michael Charles Fernandez Padua, Metro Manila (PH); Dennis Mendiola, New York, NY (US)

(73) Assignee: Smart Communications, Inc., Makati (PH)

( * ) Notice: Subject to any disclaimer, the term of this patent is extended or adjusted under 35 U.S.C. 154(b) by 0 days.

(21) Appl. No.: 13/593,777

(22) Filed: Aug. 24, 2012

(65) Prior Publication Data

US 2013/0130643 A1 May 23, 2013

Related U.S. Application Data

(60) Provisional application No. 61/527,145, filed on Aug. 25, 2011.

(30) Foreign Application Priority Data

Nov. 24, 2011 (SG) .............................. 201108719-4

(51) Int. Cl.
*H04W 4/24* (2009.01)
*H04L 29/06* (2006.01)
(52) U.S. Cl.
CPC ........... *H04L 29/06537* (2013.01); *H04W 4/24* (2013.01); *H04L 69/24* (2013.01)

USPC ........ 455/406; 455/558; 455/410; 455/414.1; 455/450; 455/452; 370/229; 370/352; 370/353; 370/356; 370/260

(58) Field of Classification Search
USPC ................. 455/405, 406–409, 410–411, 558, 455/450–452; 705/5–9; 370/229, 352, 353, 370/260, 356
See application file for complete search history.

(56) References Cited

U.S. PATENT DOCUMENTS 7,848,312 B2 * 12/2010 Zhang et al. .................. 370/352
2005/0147084 A1 * 7/2005 Zhang et al. .................. 370/352
2008/0268812 A1 * 10/2008 Meincke ...................... 455/406

* cited by examiner

*Primary Examiner* — Michael T Vu
(74) *Attorney, Agent, or Firm* — MKG, LLC

(57) ABSTRACT

A system and method for provisioning Internet access to a computing device comprising an Internet access adjustment facilitator arranged to receive a request from the computing device for adjusting Internet access from a paid Internet access mode to a toll-free Internet access mode; and a whitelist in communication with the Internet access adjustment facilitator, the whitelist maintaining a list of web resources available for toll free access by the computing device; wherein upon successful processing of the request, the list of web resources are toll free for access by the computing device. The system may further be adapted for billing/charging based on either pay-per-specified-time model or pay per action model.

15 Claims, 2 Drawing Sheets

SYSTEM AND METHOD FOR PROVISIONING INTERNET ACCESS TO A COMPUTING DEVICE

CROSS REFERENCE TO RELATED APPLICATION

This application claims the benefit of U.S. Provisional Patent Application Ser. No. 61/527,145, filed on Aug. 25, 2011, and Singapore Provisional Patent Application Serial No. 201108719-4, filed on Nov. 24, 2011, both applications are incorporated herein by reference in their entirety.

FIELD OF THE INVENTION

The present invention relates to a system and method for provisioning Internet access to a computing device. The system and method are particularly suited, but not limited to providing internet access to a mobile device and personal computers enabled with USB dongles and will be described in this context.

BACKGROUND ART

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Mobile phones have recently surpassed the conventional desktop or laptop PCs as a popular means for people to connect to the internet. This in part has been fueled by social networks and mobile software applications. The main advantage of mobile phones is in their ability to be connected to the Internet wherever the user is. Mobile phone users may receive and/or respond to Instant messaging messages, "Facebook™" tags, "Tweets™", surf the Internet via a mobile web browser instantly wherever the users are, as long as data connection (GSM, GPRS, 3G, Wi-Fi etc.) can be established.

The above advantages complement markets where a majority of telecommunication carrier subscribers prefer mobile data post-paid plans. Subscribers of these post-paid plans generally do not mind paying more per month to have unlimited Internet data access or a data usage capped at a relatively larger size, for example 12 Gigabytes (GB).

Another recent phenomenon is the use of "broadband dongles"—USB powered devices that allow computing devices such as Personal Computers/laptops to connect to the Internet using the mobile network operator (MNO) networks (3G/4G etc.)

However, providing "always on" Internet or data connection for smartphones and dongle-powered PCs has remained a challenge for telecommunications carriers in markets dominated by users who prefer "prepaid plans" (or "pay-as-you-go" plans). Users under these prepaid plans are less willing to pay a relatively larger subscription fee for full unlimited internet access. A typical prepaid plan is based on a pay-per-specified-time model, such as for example 10 pesos for 30 minutes of fast Internet connection (i.e. at maximum bandwidth as provided by the mobile network carrier). Another variation to the pay-per-specified time model may be a daily "always on" access to only social networking sites such as Facebook™ or Twitter™ for 20 pesos per day.

The above mentioned prepaid/pay-per-specified-time plans do not offer enough flexibility to subscribers. For example, many users may be interested in visiting certain websites or URLs but not others. Further, certain telecommunications carriers may be able to provide certain services such as URLs or APIs free of charge to their subscribers without the need to pay for Internet access, or providing free of charge certain mobile applications or 'apps', without the need to pay for downloading such mobile applications. Subscribers to such telecommunications carriers may be only interested in these specific mobile applications, URLs or APIs without the need for general Internet access, but at present there is no system or mechanism to allow flexibility to toggle between a paid and free Internet access service.

As prepaid plan subscribers are sensitive to cost, another challenge for telecommunications carriers is to deliver Internet connection at relatively lower "sachet" price points, such as below 20 pesos daily, while still providing prepaid plan users with "always on" experience. While this may be possible for certain phones which are efficient in terms of consuming data bandwidth (such as feature phones or a Blackberry™ for example), it is typically difficult to implement such "sachet" price points for more recent smartphones models which require relatively higher data bandwidth because to do so may be unprofitable for mobile network operators (MNOs) or telecommunications carrier. MNOs typically have relatively limited Internet bandwidth as compared to full Internet service providers. From the perspective of the MNOs, the relevant question for implementing "sachet" price points for smartphone models would be "What kind of Internet service can be offered profitably at 5 peso (or approximately US 10 cents per day) to capture the markets of these smartphone users?"

Along the same line of cost consideration for prepaid plan subscribers, a fixed cost per unit time (e.g. 10 pesos per 30 minutes) plan may be deemed relatively more expensive for a user with Internet access outside an area with high network coverage (e.g. metro areas) compared to a user within the metro area. A prepaid plan subscriber outside the metro area requires more time to download a file or carry out certain actions (such as video streaming) compared to a subscriber within the metro area. This is due to the relative less dense network coverage in non-metro areas. In such cases, a user may be unduly penalized with a pay-per-specified-time plan.

In light of the above, there also exists a need for different charging plans and billing mechanisms that caters to pre-paid subscribers depending on the location of the subscriber.

The present invention seeks to address the above mentioned concerns and provide a system and method that alleviates the above mentioned drawbacks at least in part.

SUMMARY OF THE INVENTION

It is to be appreciated that "free access" in the context of access to web resources including URLs, APIs or other websites/IP addresses refer to toll free 'always on' data access, i.e. access to these URLs, APIs, websites/IP addresses would be free to the user as provided by a telecommunications carrier. Such always on data access is to be distinguished from any subsequent actions to retrieve, input or manipulate data, including downloading of videos/audio files for example. Actions to retrieve, input or manipulate data may be chargeable, although the access to the data itself may be toll free.

In addition, "free access" in the context of access to mobile applications ("apps") refers to downloading such apps but usage of such "apps" to download/view/stream or perform other functions may be chargeable.

It is further to be appreciated that 'Internet access' in the context of the description generally refers to mobile data Internet service such as GPRS, Enhanced Data rates for GSM Evolution (EDGE), 3G, LTE, 4G network, Wi-Fi tethering etc. unless otherwise stated.

In accordance with a first aspect of the present invention, there is provided a system for provisioning Internet access to a computing device comprising an Internet access adjustment facilitator arranged to receive a request from the computing device for adjusting Internet access from a paid Internet access mode to a toll-free Internet access mode; and a whitelist in communication with the Internet access adjustment facilitator, the white list maintaining a list of web resources available for toll free access by the computing device; wherein upon successful processing of the request, the list of web resources are toll free for access by the computing device.

Preferably any subsequent action to retrieve, input or manipulate data in the toll-free Internet access mode is chargeable. Ideally, each subsequent action to retrieve, input or manipulate data is charged or billed based on a pay per action model. Alternatively, each subsequent action to retrieve, input or manipulate data is charged or billed based on a flat fee for a defined set of subsequent actions.

Preferably in the toll-free Internet access mode the comprising device is not allowed to access any web resources not within the whitelist.

Preferably the request for adjusting Internet access is a Short Messaging Service (SMS) message, electronic text message, or Unstructured Supplementary Service Data (USSD) message.

Preferably the system further comprises a subscriber database arranged to maintain details of a plurality of subscribers; and an accounting database arranged to be in data communication with the subscriber database for settlement and checking of available funds for each subscriber and maintaining a history of transaction of each subscriber.

Preferably the mobile device is arranged to send the request automatically to the Internet access adjustment facilitator based on a priority-based algorithm that typically ranks higher quality, or more open plan or faster user subscriber plan higher in priority. More preferably the pay per action model is activated by sending a request from the mobile device to the Internet access adjustment facilitator, the Internet access adjustment facilitator operable to, upon receiving the request, toggle between an existing billing infrastructure which implements a pay-per-specific time model and an independent billing module implementing the pay per action model.

Preferably the toggle from the existing billing infrastructure to the independent billing module is achieved either by switching off the existing billing infrastructure; or defining the data bandwidth connection as a zero tariff.

In accordance with a second aspect of the present invention there is provided a method for provisioning internet access to a computing device comprising the following steps: receiving at an Internet access adjustment facilitator from the computing device a request to adjust Internet access from a paid Internet access mode to a toll-free Internet access mode; processing the request to adjust Internet access; and upon successful processing, adjusting the Internet access to the computing device; wherein in the toll-free Internet access mode; web resources within a whitelist are toll free for access by the computing device.

Preferably any subsequent action to retrieve, input or manipulate data in the toll-free Internet access mode is chargeable. More preferably the each subsequent action to retrieve, input or manipulate data is charged or billed based on a pay per action model. Alternatively, the each subsequent action to retrieve, input or manipulate data is charged or billed based on a flat fee for a defined set of subsequent actions.

Preferably in the toll-free Internet access mode the computing device is not allowed to access any web resources not within the whitelist.

Preferably the request for adjusting Internet access is a Short Messaging Service (SMS) message, electronic text message, or Unstructured Supplementary Service Data (USSD) message.

Preferably the Internet access adjustment facilitator is in data communication with a subscriber database arranged to maintain details of a plurality of subscribers; and an accounting database arranged to be in data communication with the subscriber database for settlement and checking of available funds for each subscriber and maintaining a history of transaction of each subscriber.

Preferably the computing device is arranged to send the request automatically to the Internet access adjustment facilitator based on a priority-based algorithm that typically ranks higher quality, or more open plan or faster user subscriber plan higher in priority.

Preferably the pay per action model is activated by sending a request from the computing device to the Internet access adjustment facilitator, the Internet access adjustment facilitator operable to, upon receiving the request, toggle between an existing billing infrastructure which implements pay-per-specific time model and an independent billing module implementing the pay per action model. More preferably the toggling from the existing billing infrastructure to the independent billing module is achieved either by switching off the existing billing infrastructure; or defining the data bandwidth connection as a zero tariff.

In accordance with a third aspect of the present invention there is a mobile device containing software instructions, wherein upon execution of the software instructions, performs the method according to any of the second aspect of the invention toad just the Internet access from a paid Internet access mode to a toll-free Internet access mode.

Preferably, where the method comprises an additional step of billing for the bandwidth consumed based on either a pay-per-specific time model or pay per action model, wherein the pay-per-specific time model or pay per action model is activated by sending a request from the mobile device to the Internet access adjustment facilitator, the Internet access adjustment facilitator operable to, upon receiving the request, toggle between an existing billing infrastructure implementing the pay-per-specific time model and an independent billing module implementing the pay per action model.

BRIEF DESCRIPTION OF THE DRAWINGS

The present invention will now be described, by way of example only, with reference to the accompanying drawing, in which.

Figure 1:
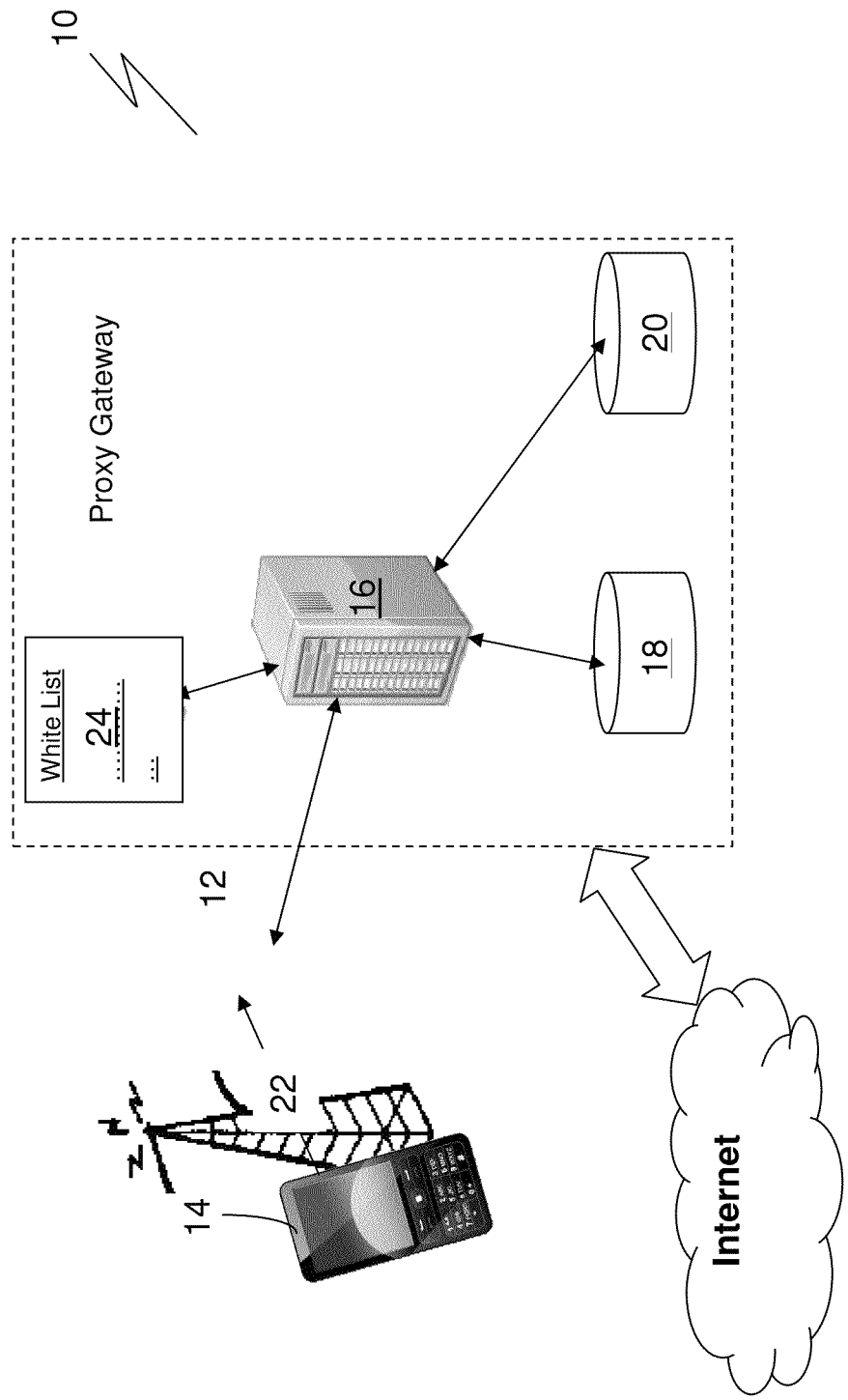
FIG. 1 is a schematic representation of a system for provisioning Internet access from a telecommunications network to at least one mobile device in accordance with an embodiment of the present invention.

Other arrangements of the invention are possible and, consequently, the accompanying drawings are not to be understood as superseding the generality of the preceding description of the invention.

Preferred Embodiment Of The Invention

In accordance with an embodiment of the present invention there is a system 10 for provisioning Internet access from a host 12 to at least one computing device 14. The system 10 comprises an Internet access adjustment facilitator 16 and a whitelist 24 in data communication with the Internet access adjustment facilitator 16.

The host 12 may be a telecommunications carrier or mobile network operator.

The computing device 14 may preferably be a mobile phone. More preferably, the computing device 14 is a smartphone capable of the installation of mobile software application or 'app'. The computing device 14 is connectable to the Internet via various mobile data services such as GPRS, Enhanced Data rates for GSM Evolution (EDGE), 3G, Wi-Fi, LTE, 4G network etc.

Alternatively, the computing device 14 may be a personal computer/laptop comprising a USB wireless adapter, such as a dongle, for plugging into a personal computer (desktop or laptop) to access the system 10 and the Internet adjustment facilitator 16. Such an arrangement allows the personal computer/laptop to access the telecommunications network's GPRS, Enhanced Data rates for GSM Evolution (EDGE), 3G, Wi-Fi, LTE, 4G network etc.

The Internet access adjustment facilitator 16 is adapted to process requests 22 from the user of computing device 14 to the telecommunications network 12 for the control of Internet access. In this sense, the Internet access adjustment facilitator 16 is within a proxy server for connecting to the Internet. The requests 22 are typically in the form of an electronic signal/message wherein a software application is installed on the mobile device 14 or personal computer (PC) for such a purpose. Other means of communicating with the adjustment facilitator 16 may be in the form of a simple text or Short Messaging Service (SMS), Unstructured Supplementary Service Data (USSD) messages or other similar messaging service.

The system 10 optionally comprises a subscriber database 18. The subscriber database 18 maintains details of the subscribers of telecommunications network 12, such as the Mobile Subscriber Integrated Services Digital Network Number (MSISDN) of each subscriber mobile phone; and whether the subscriber is on any prepaid/post-paid plans as well as the details of the plans such as the expiry of the prepaid plan (if applicable). The subscriber database 18 is in data communication with an accounting database 20 for the settlement and checking of available funds for the subscriber for computing device 14. The accounting database 20 further maintains a history of transaction of each subscriber.

In the case where the mobile Internet service is a GPRS service for example, the Internet access adjustment facilitator 16 is typically located between the Gateway GPRS Support Node (GGSN) and the Service Aware Support Node (SASN) of the GPRS core network.

The whitelist 24 is in data communication with Internet access adjustment facilitator. The whitelist 24 maintains a list of web resources comprising URLs, and APIs and other web services as approved by telecommunications carrier 12. These approved URLs and APIs are considered "toll free", i.e. available for free access by the computing device 14 or free to be accessed by a user as far as charging/billing based on the data network of the telecommunications network 12 is concerned. Whitelist 24 is in data communication with Internet access adjustment facilitator.

The invention will now be described in the context of its intended use.

The computing device 14 is preferably installed with a dedicated mobile software application depending on the particular model of the computing device 14. For a typical smartphone such as an iPhone™ or Android™, this may be an "app" as colloquially known. For ease of reference, the dedicated mobile software application will be interchangeably known as "Safe Browsing App".

Prior to use, the computing device 14 is checked if it is registered as a subscriber of the system 10 via checks on the MSISDN of the computing device 14 or other methods as well known to a skilled person. For the case where the computing device 14 is a personal computer or laptop that connects to the Internet via a dongle, the dongle typically comprise a subscriber identity module (SIM) card within the same, the SIM card having a MSISDN. If the computing device 14 is not a subscriber, the user of a computing device 14 may optionally be prompted a message through the Safe Browsing App to register or choose from any set of services, or the telecommunications network operator or mobile network operator (MNO) 12 may have dedicated APNs for the purpose of carrying out the present invention and requires the user of the computing device 14 to change the Access Point Name (APN) of the mobile device. The user may for example get a text message or a notification on his app asking him to make this change.

An example of the message is as follows:

"To use the Safe Browsing App, please change the APN of your smartphone to internet.abc.com".

Alternatively, the subscriber does not have to be prompted to change the APN explicitly. The MNO 12 may employ an intelligent APN provisioning system that enables automatic connection (in the background) to the Internet.

The installed software application (Safe Browsing Apps) may be manually activated by the user of computing device 14 wherein the installed application opens a user interface providing the option to adjust internet access type as desired, or may include detecting the data usage profile of the subscriber for computing device 14. The data usage profile details any existing data plan/package which the subscriber is currently on.

The Safe Browsing Application also provides the user interface for the user of computing device 14 to toggle control of his internet access between a paid Internet access and a toll-free Internet access. Examples of these two Internet access are as described in the two modes as follows:

a 'full access' mode (Paid Internet access mode)—full access to the Internet (provided by MNO/telecommunications carrier) at maximum speeds available. For example, 3G/4G networks at 10 peso for 30 minutes or a discounted rate for slower speeds such as EDGE or GPRS.

a 'limited access' mode (Toll free Internet access mode)—restricted to certain mobile data services; including certain websites, URLs, Application Programming Interfaces (APIs) and IP addresses as maintained by the whitelist 24; Access to these services as listed in whitelist 24 will not incur any mobile data charges to the subscriber. Sites, URLs, APIs, and/or services outside of this whitelist are however non-accessible to the user in this mode.

A third 'default mode'—upon detection by the system 10 to be on an existing data plan (such as a 10 pesos for 30 minutes fast internet access), the default mode overrides any other modes until the expiration of the data plan.

The "Safe Browsing App" may be pre-installed or downloadable. The App may be a software 'widget' which includes an graphical representation of an on/off switch on the user interface of computing device 14, allowing the user of computing device 14 to toggle between the 'full access' (ON) mode and the 'limited access' (OFF) mode. Upon clicking/sliding the 'On' toggle, the user sends a request 22 for 'full access' and the clicking/sliding of the 'off' toggle sends a request 22 for 'limited access' mode. The 'default' mode is typically not presented as an option to the user of computing device 14 and will automatically kick once detected that an existing data plan is available.

Alternatively, the request 22 may be sent as an SMS (access code required) or via the World Wide Web (www).

Further details on the user adjustable 'full access' and 'limited access' modes and their functionality, as well as its operation under various computing devices 14, including smartphones and legacy non-smartphones) are described as follows:

'Full Access' Mode:
a. Activated via the Safe Browsing App, via toggle 'ON' (may be shown as a graphical lever or switch on the user interface);
b. Allows full access to the worldwide web (www) via Internet data service
c. Billed based on traditional billing infrastructure in terms of cost per X amount of time or size (kB/MB). If the Subscriber has no available subscriptions or data packages, the Subscriber will be automatically charged the prevailing rate (e.g. 10 pesos for 30 minutes) or any charge rate as set by telecommunications carrier/MNO 12.
d. While the default rate of 10 peso for 30 minutes is applicable for a 3G/4G network, should the subscriber connect at a lower speed (based on EDGE/GPRS for example), a significant discount off the 10 peso for 30 minutes may be offered to the subscriber. In the regard, the Safe Browsing App will determine if the subscriber is connected at 3G/4G or at a relatively lower speed.
e. For instances where the computing device 14 is connected to the Internet at 3G/4G but the actual Internet speed falls below its rated or advertised speed due to network congestion for example, upon detection by the Safe Browsing App a significant discount may be made to the typical 10 peso for 30 minutes. The advice of charge will be calculated by the accounting database 20 and displayed to the Subscriber through one of the following ways:
  i. On a Smartphone Device 14: a notification will be displayed for the Subscriber.
  ii. On a PC with a dongle, a prompt or notification will be displayed anywhere in the relatively large desktop environment.
  iii. On a feature phone: an SMS will be sent to the subscriber the first time they use the service.

'Limited Access' Mode
a. Displays approved whitelist of services on User Interface of the Safe Browsing App. In addition, displays icons of independent 'Apps' that are actively connected to the Internet. These are apps that have been created by third parties that now exist in the itunes™ store or android market, and have been whitelisted for 'toll free' connection to the Internet.
b. The whitelist may further include certain URLs and IP addresses by browsers.
c. Blocks all other data from the Subscriber's phone 14 from passing through the Network.
d. If the Subscriber has no availed subscriptions/data packages, the Subscriber will not be charged and will not be able to access other data not within the whitelist 24.
e. If the mobile phone's browser is used instead of the Safe Browsing App:
  i. The user will be redirected to a Wireless Application Protocol (WAP) URL to show that Internet is on 'LimitedAccess'—Off mode
  ii. The user will be instructed how to turn on the Internet for specific Apps only or for set of URLs or IP addresses There are a number of possible ways for subscribers to switch between the 'full access' and 'limited access' modes. For example, the user may download the safe browsing app/widget; send a SMS to the Internet access adjustment facilitator 16; or via access of a mobile web browser (WebConnect).

Users who subscribe to a data plan/data Package activates the 'default' mode automatically to override whatever mode he is currently at.

If the user has downloaded the 'safe browsing' app/widget, a set of 'console' rules, governs the interaction between the user subscriber and the widget depending on the type of computing device 14.

If the computing device 14 is a smartphone specifically developed for the telecommunications carrier 12 (hereinafter known as a netphone), after the initial user registration process, the widget will be set to the 'limited access' (OFF) mode, which is the default setting.

Interaction with the Safe Browsing App via for example tapping or sliding the User interface provided on the App/widget will toggle the OFF mode to the unlimited access (ON) mode. A prompt will appear and inform the user that by switching modes, mobile Internet will be activated and the subscriber will be charged the prevailing rate (e.g. P10 for 30 minutes). If the subscriber wishes to switch to the OFF mode, he may simply interact with the widget again as mentioned above. The subscriber may be prompted a message along the lines of:

"Mobile Internet will no longer be available to $3^{rd}$ Party applications, and Browsing on the device will be disabled." The services allowable under the whitelist 24 will however continue to be accessible in the 'Off' mode.

If the computing device 14 is any other smartphone which is not specifically developed for the telecommunications carrier 12, upon installation of the safe browsing app/widget, the widget will by default be set to the 'full access' ON mode instead of the OFF mode as described above. Interaction with the Widget will toggle from the ON mode to OFF mode and vice-versa.

If the computing device 14 is any other legacy phones (i.e. non Smartphones) capable of accessing the internet and installing the widget, the default setting is the ON mode. The installed widget is capable of detecting the current state of the computing device 14 data and APN setting. If detected that the mobile device's data (internet setting) is disabled, the installed widget will display the status of the computing device 14 as disabled. If the subscriber interacts with the widget, for example via tapping the screen of the mobile device to enable the Device's Data access and prompts the subscriber that the device Data access is enabled. The widget will then send a request 22 to the Internet access adjustment facilitator 16 to switch to 'limited access' MODE. Upon tapping the widget again will send another request 22 to switch to the 'full access' mode and enable all Mobile Data to pass through the Network.

As an alternative to installing the software widget, the subscriber may choose to switch between the 'full access' and 'limited access' modes via SMS. Switching via SMS may be performed by any phone via console rules as follows:

The subscriber sends an SMS comprising an Access Code, password, and the desired mode. The Internet access adjustment facilitator 16 responds with an SMS stating the current mode and a confirmation to proceed with the change. The subscriber then sends a confirmation SMS. Upon switching mode, the Internet access adjustment facilitator 16 will send a confirmation of the switch in mode.

The subscriber may switch mode on a mobile internet browser. The console rules governing the switch mode via web connect is as follows.

The subscriber of mobile device accesses web connect and logs in, for example using his user ID and password. Upon logging in, the web browser displays the current mode of the computing device 14. In the absence of any subscriber plan, the default mode is the 'unlimited access' mode. The subscriber is then allowed to change the mode. An SMS will be sent to the subscriber on first use of the switch mode service.

For roaming subscribers, in the absence of any data package/plan the 'full access' mode is applicable so as not to disrupt any data service. However, a prompt/SMS may be sent to the roaming subscriber to advise him to disable data roaming on his mobile device 14 so as not to incur additional roaming cost.

Should a user/subscriber wish to buy a data subscription plan/package, the console rules are defined as follows:

For a Netphone, the subscriber accesses the Subscription application (available to netphone), selects a Package and taps on BUY option. Upon confirmation, the Internet Widget will automatically toggle to ON—'full access' mode without further input required from the subscriber. A prompt will be displayed to the subscriber indicating that the Widget has been set to ON, and that all Mobile Data use is ACTIVE.

On other Smartphone 14, the subscriber may be availed a Package via SMS or mobile web browser. Upon confirmation, the Internet Widget will automatically toggle to the ON MODE. A prompt will be displayed to the subscriber indicating that the Widget has been set to ON, and that all Mobile Data use is ACTIVE.

For other legacy Phones, the subscriber may be availed of a Package via SMS or mobile web browser. The Internet ON/OFF service will automatically toggle to ON MODE. An SMS will then be sent to the subscriber confirming the Package and indicating that the Internet ON/OFF service has been set to ON, and that all Mobile Data use is now ACTIVE.

It is to be appreciated that the Internet access adjustment facilitator 16 may further include steps to verify the MSISDN of the computing device 14 is in the subscriber database 18. Further steps such as password authentication, SMS verification or other forms of authentication may also be performed as known to a person skilled in the art to authenticate the subscriber.

It is further appreciated that once any request 22 to switch mode is successfully verified, the Internet access adjustment facilitator 16 proceeds to adjust the internet access for the subscriber of computing device 14. This is based on the whitelist 24 as maintained by the telecommunications carrier 12.

The described system and method further allows the user to stop or pause the 'limited access' as and when desired, and thus better able to control the part of his remaining credit of the pre-paid plan.

In the case where the computing device 14 is a personal computer/laptop having a dongle, the user interface may be an Internet browser that is able to be connected to the whitelist 24 for accessing the 'toll free' services. In the case where the Internet browser is for example "Google chrome", accessed to Google chrome based applications are typically whitelisted for "toll free" connection. Another user interface can be a program downloaded and installed on a personal computer/laptop, as has been the typical case.

Figure 2:
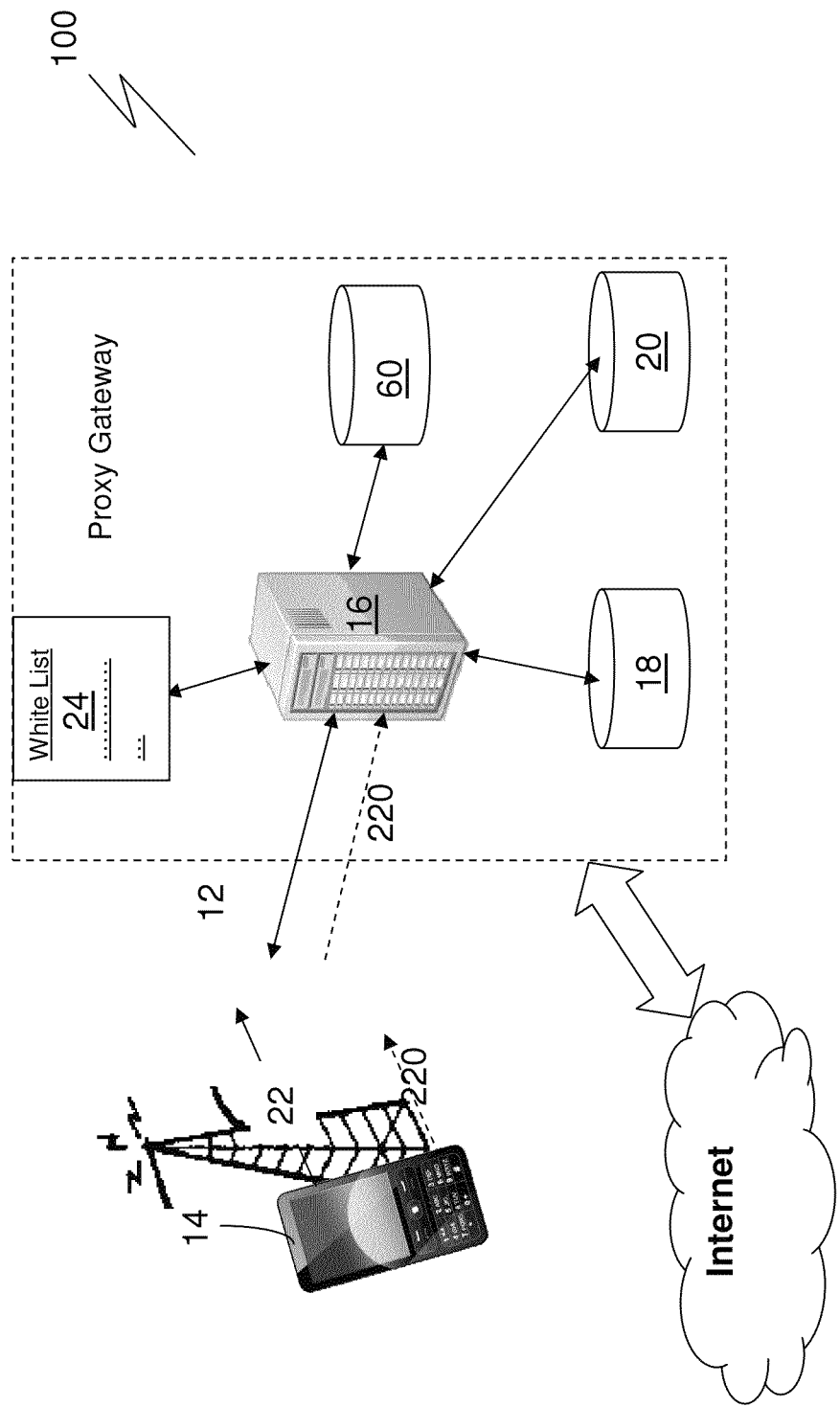
FIG. 2 is a schematic representation of a system for provisioning Internet access from a telecommunications network to at least one mobile device in accordance with another embodiment of the present invention.

In accordance with another embodiment of the present invention, as illustrated in FIG. 2, wherein like numerals reference like parts, there is a system 100 for provisioning Internet access from a telecommunications carrier 12 to at least one computing device 14. The system 10 comprises an Internet access adjustment facilitator 16, a subscriber database 18 and a whitelist 24 in data communication with the Internet access adjustment facilitator 16. The system 10 further comprises an independent billing/charging module 60. The billing module 60 is an independent separate value-added billing module based on the mechanism of 'per action charging'.

Independent billing module 60 is operable to be in data communication with the subscriber database 18 and accounting database 20. Independent billing module 60 is arranged to provide a 'per action charging' mechanism for charging/billing a subscriber for his Internet bandwidth usage. The independent billing module 60 is advantageous because it does not require modifications to the existing billing charging structure/database and may be implemented as a convenient 'add-on' to the existing resources.

'Per action charging' is a charging model based on an action taken by the subscriber. Examples of such action(s) are defined as follows:

i. Updating one's status on Facebook™ or other social networking sites including Tweeter etc.

ii. Viewing an up-to-10-minute video or 'flick' on Youtube™; In this regard, billing or charging occurs once for a full download and viewing, i.e. the bill/charge is the same regardless of how long the video takes to download or begins to stream. This is to be contrasted from present charging methods, where the end user is charged based on time taken for download.

iii. Uploading images/videos in social networking sites (Similar to the Youtube™ viewing example, the bill/charge to the user is the same regardless of how long it takes for a photo to upload or how big a file the upload entails.) and/or iv. Any other actions which the user, the application developer, or the telecommunications network service provider may define. This may include toll free downloads of mobile applications ("apps") but usage of these apps to perform subsequent functions (including i to iii above) may be chargeable on a per action basis.

In the context of the embodiment, other actions which may fall within the definition of 'per action charging' may include 'per click within dedicated smartphone 'App'; per click within web browser etc.

'Per action charging' offer additional choice for a pre-paid subscriber as it allows the pre-paid subscriber to choose from the conventional 'pay-per-specified time' model ('pay-per-specified time' mode such as 10 pesos for 30 minutes of Internet connection, and/or the daily "always on" access to only social networking sites such as Facebook™ or Twitter™ for 20 pesos daily) to the 'per action charging' model depending on his preference such as time, location and/or usage.

In this embodiment, the previously discussed 'Safe Browse App' may include an additional function which allows a subscriber of computing device 14 to toggle between the 'pay-per-specified action' charging/billing models to the 'per action charging' charging/billing model. Alternatively, the billing/charging function may be implemented as another dedicated software application or App known as the 'Flexible Billing' App.

The request 220 for switching to per action charging is in the form of simple text or Short Messaging Service (SMS), Unstructured Supplementary Service Data (USSD) messages or any other form of an electronic signal/message wherein a software application is installed on the mobile device 14 for such a purpose.

The embodiment with emphasis on the usage of the billing module 60 for charging/billing a subscriber's data bandwidth usage will next be described in the context of its use.

Upon detection that per action charging is to be adopted via a request 220 from the user of computing device 14, the Internet access adjustment facilitator 16 switches from the existing billing infrastructure of the telecommunications carrier 12 to the billing module 60. This may be achieved by either:

switching off the existing billing infrastructure; or defining the Internet connection as a zero tariff (equivalent to no charge on existing billing infrastructure).

The billing module 60 then takes over the billing/charging based on per action charging once detected that the computing device 14 is in the 'limited access mode' as previously discussed in the previous embodiment. In particular, for the 'limited access' mode as discussed, the following charging methods shall apply charge per action on a specific App or a browser within the whitelist 24:

A flat charge for a continuous Internet connection for specific Apps or set of web resources (URLs or IP addresses) for subsequent actions for the APIs, URLs within the whitelist 24 (i.e. initial access to these web resources within the whitelist 24 is free but subsequent actions are billable).

If the user chooses to exercise the option of 'charge per action mode', while on Limited Access, a simplified flat nominal charge per action tariff may be charged. Such action includes updating one's Facebook's status, downloading and streaming a YouTube video, etc. If the user chooses the FLAT CHARGE for continuous streaming while on Limited Access, that charge will be applied, turning on Internet connection only for the specified apps, URLs IP addresses, and overriding Full Access mode if the user has been on the limited access mode.

The billing module 60 is complementary with the flexible provision of Internet access. In particular, when a request 22 is sent to the Internet access adjustment facilitator 16 to adjust the from the 'full access' mode to 'limited access' mode in conjunction with the request 220 to bill based on per action charging; the subscriber of computing device 14 gains more control of the type of charging/billing applicable depending on where he/she may be at. For example at a non-metro area with less dense network coverage, the user has the flexibility to turn on the 'limited access' mode and make use of the whitelist 24 to access web resources at no charges and be charged at 'per action' charging for any subsequent actions taken.

The system 100 may be suited to incorporate other permutations and combinations of usage. In particular, the billing module 60 may include differential pricing for accessing certain websites, URLs, Application Programming Interfaces (APIs) and IP addresses. Access to these mobile services will not incur any mobile data charges to the subscriber or will be at a discounted rate.

For the "full access" mode, the operational speeds may be detected via a speed monitoring application installed on the computing device 14. This is preferably integrated with the Flexible Billing App. By using test data packets (similar to concept of a "PING"), the operational speed of the computing device 14 may be estimated and charged based on the 3G/4G high speed or possibly at a discounted rate for lower speed.

For the "limited access" mode, in addition to the 'charge per action' billing method, a "flat fee for a defined set of apps" method, or some combination of both may be adopted.

As an alternative to manual switching by a user subscriber, an automatic method for switching from one mode to another may be provided. The automatic method is a priority-based algorithm that typically ranks higher quality, or more open plan or faster plan higher in priority unless otherwise switched manually by the user. For example, if the user is subscribed to a data plan that translates to a full Access mode as described, any limited access mode purchased is override.

The priority-based algorithm of the automatic method means that once the Full Access mode subscription has expired (say the full 30 minutes in a 10 peso for 30 minutes plan), the user will be automatically switched to "Limited Access" mode.

In the case where the computing device is a personal computer/laptop, these modes may be presented as a form of notification anywhere within a relatively larger desktop/laptop screen area. Clicking on such notification will take the subscriber to a Settings Area. The Settings indicate, among others, the mode that the user is currently on and the remaining balance information. The remaining balance would be either shown in terms of currently (e.g. Pesos) or time elapsed and time remaining. In the Settings section, the subscriber may also choose to switch manually from one mode of connection to another.

The "Flexible Billing App" may be a feature which may be integrated as an integral module with the Safe Browsing App or any other Apps. In the case of it being a separate App, it may take the form of a software 'widget' which includes an graphical representation of an on/off switch, such that when in the 'on' position, it indicates which mode of connection is active, balance information, and a graphical lever that allows the subscriber to switch manually to a specific modes. Upon selecting a particular mode of connection, the Flexible Billing App sends a request 22 to the Internet access adjustment facilitator 16 for instructions to adjust the same.

It is to be appreciated that 'charge per action' may include the following 'Per click within app' or 'per click within web browser' and 'per click within program' 'Per app running always on, for specified period' and/or 'per set of apps running always on, for specified period'.

Alternatively, the request 22 may be sent as an SMS (access code required), USSD command, or via the world wide web (www).

The Internet access adjustment facilitator 16 may further comprise a bandwidth throttler (not shown) to process requests 22 from the user of computing device 14 to the telecommunications network 12 for the adjustment of data bandwidth between a 'trickle' mode—i.e. 9.6 kbps to 14.4 kbps and a 'boost' mode—2 Mbps onwards if on 3G for example, on demand. The 'Boost' mode provides the user interface (via the Safe Browse and/or Flexible billing app) for the user of computing device 14 to toggle control of his data speed between the 'trickle' mode—i.e. 9.6 kbps to 14.4 kbps and the 'boost' mode—2 Mbps onwards if on 3G for example, on demand. For the subscriber having a pre-paid contract or plan, the default mode for the data speed is the 'trickle' mode.

In such an instance, a 'boost' mode may be included in the system and the charge/bill per-action plan may be applied to the boost mode.

"Boost" Mode

Upon selecting the option 'Boost' on the user interface, the request to change the data speed from 'trickle' to '3G/4G' is sent to the Internet access adjustment facilitator 16. The Internet access adjustment facilitator 16 proceeds to verify if the MSISDN of the computing device 14 is in the subscriber database 18. Further steps such as password authentication, SMS verification may also be performed as known to a person skilled in the art to authenticate the subscriber.

Once the request is successfully verified, the Internet access adjustment facilitator 16 checks the accounting database 20 to make sure that the subscriber has enough funds to pay for the 'boost'.

Upon determining that there are enough funds in the subscriber pre-paid account or pre-paid card, the Internet access adjustment facilitator 16 proceeds to adjust the bandwidth settings for the subscriber of computing device 14. This is done via a bandwidth throttler, which either caps the data speed of connection between the computing device 14 to the internet or allows any excess available data bandwidth to the computing device 14, by the Internet access adjustment facilitator 16.

The Internet access adjustment facilitator 16 may include a detecting algorithm for detecting the usage profile of the subscriber for computing device 14.

It is to be appreciated that while the 'full access' and "Limited access" modes are mutually exclusive, the "Limited access" mode can operate simultaneously while on the "Boost" mode.

As an example, in the combination of "Boost" with "Limited access" mode, fast Internet access may advantageously be achieved for the selected whitelisted services at no cost for the user while slower for all others not on the White List. If Facebook™ is on the whitelist, this means that the subscriber could enjoy a full, fast Facebook™ experience; this will not be the case for non-whitelisted Apps. These non-whitelisted apps will operate at trickle speeds. Nonetheless for "notifications" or when a new email is received or an IM message is sent, the Boost mode, running on trickling mode for non-whitelisted Apps, may be adequate.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein. In particular, features from one or more embodiments may be combined to form further embodiments.

What is claimed is:

1. A system for provisioning Internet access to a computing device comprising:
an Internet access adjustment facilitator arranged to receive a request from the computing device for adjusting Internet access from a paid Internet access mode to a toll-free Internet access mode; and
a whitelist in communication with the Internet access adjustment facilitator, the whitelist maintaining a list of web resources available for toll free access by the computing device;
wherein upon successful processing of the request, the list of web resources are toll free for access by the computing device,
wherein any subsequent action to retrieve, input or manipulate data in the toll-free Internet access mode is chargeable,
wherein each subsequent action to retrieve, input or manipulate data is charged or billed based on a pay per action model, and
wherein the pay per action model is activated by sending a request from the mobile device to the Internet access adjustment facilitator, the Internet access adjustment facilitator operable to, upon receiving the request, toggle between an existing billing infrastructure which implements a pay-per-specific time model and an independent billing module implementing the pay per action model.

2. The system according to claim 1, wherein in the toll-free Internet access mode the computing device is not allowed to access any web resources not within the whitelist.

3. The system according to claim 1, wherein the request for adjusting Internet access is a Short Messaging Service (SMS) message, electronic text message, or Unstructured Supplementary Service Data (USSD) message.

4. The system according to claim 1 comprising a subscriber database arranged to maintain details of a plurality of subscribers; and an accounting database arranged to be in data communication with the subscriber database for settlement and checking of available funds for each subscriber and maintaining a history of transaction of each subscriber.

5. The system according to claim 1, wherein the mobile device is arranged to send the request automatically to the Internet access adjustment facilitator based on a priority-based algorithm that typically ranks higher quality, or more open plan or faster user subscriber plan higher in priority.

6. The system according to claim 1, wherein the toggling from the existing billing infrastructure to the independent billing module is achieved either by switching off the existing billing infrastructure; or defining the data bandwidth connection as a zero tariff.

7. The system according to claim 1, wherein each subsequent action to retrieve, input or manipulate data is charged or billed based on a flat fee for a defined set of subsequent actions.

8. A method for provisioning internet access to a computing device comprising the following steps:
 a. receiving at an Internet access adjustment facilitator from the computing device a request to adjust Internet access from a paid Internet access mode to a toll-free Internet access mode;
 b. processing the request to adjust Internet access; and
 c. upon successful processing, adjusting the Internet access to the computing device;
 wherein the toll-free Internet access mode, web resources within a whitelist are toll free for access by the computing device,
 wherein any subsequent action to retrieve, input or manipulate data in the toll-free Internet access mode is chargeable,
 wherein each subsequent action to retrieve, input or manipulate data is charged or billed based on a pay per action model, and
 wherein the pay per action model is activated by sending a request from the computing device to the Internet access adjustment facilitator, the Internet access adjustment facilitator operable to, upon receiving the request, toggle between an existing billing infrastructure which implements a pay-per-specific time model and an independent billing module implementing the pay per action model.

9. The method according to claim 8, wherein in the toll-free Internet access mode the computing device is not allowed to access any web resources not within the whitelist.

10. The method according to claim 8, wherein the request for adjusting Internet access is a Short Messaging Service (SMS) message, electronic text message, or Unstructured Supplementary Service Data (USSD) message.

11. The method according to claim 8 comprising a subscriber database arranged to maintain details of a plurality of subscribers; and an accounting database arranged to be in data communication with the subscriber database for settlement and checking of available funds for each subscriber and maintaining a history of transaction of each subscriber.

12. The method according to claim 8, wherein the computing device is arranged to send the request automatically to the Internet access adjustment facilitator based on a priority-based algorithm that typically ranks higher quality, or more open plan or faster user subscriber plan higher in priority.

13. The method according to claim 8, wherein the toggling from the existing billing infrastructure to the independent billing module is achieved either by switching off the existing billing infrastructure; or defining the data bandwidth connection as a zero tariff.

14. The method according to claim 8, wherein each subsequent action to retrieve, input or manipulate data is charged or billed based on a flat fee for a defined set of subsequent actions.

15. A mobile device performs the method of claim 8 to adjust the Internet access from a paid Internet access mode to a toll-free Internet access mode,
  wherein the method comprises an additional step of billing for the bandwidth consumed based on either a pay-per-specific time model or pay per action model, wherein the pay-per-specific time model or pay per action model is activated by sending a request from the mobile device to the Internet access adjustment facilitator, the Internet access adjustment facilitator operable to, upon receiving the request, toggle between an existing billing infrastructure implementing the pay-per-specific time model and an independent billing module implementing the pay per action model.

* * * * *